(12) United States Patent
Nishimura et al.

(10) Patent No.: US 7,760,667 B2
(45) Date of Patent: Jul. 20, 2010

(54) FIRST-ARRIVAL LEARNING METHOD, RELAY APPARATUS, AND COMPUTER PRODUCT

(75) Inventors: Kazuto Nishimura, Kawasaki (JP); Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 11/799,134

(22) Filed: Apr. 30, 2007

(65) Prior Publication Data

US 2007/0274295 A1 Nov. 29, 2007

(30) Foreign Application Priority Data

| May 26, 2006 | (JP) | ............................. 2006-146774 |
| Dec. 19, 2006 | (JP) | ............................. 2006-341547 |

(51) Int. Cl.
    *H04L 12/66* (2006.01)
(52) U.S. Cl. ...................................... 370/255; 370/352
(58) Field of Classification Search ........................ None
    See application file for complete search history.

(56) References Cited

U.S. PATENT DOCUMENTS

| 6,934,258 B1* | 8/2005 | Smith et al. ................. 370/238 |
| 7,188,189 B2* | 3/2007 | Karol et al. ................. 709/238 |
| 2003/0091029 A1* | 5/2003 | Jo et al. ...................... 370/352 |
| 2003/0161275 A1* | 8/2003 | Malhotra et al. ............ 370/256 |
| 2006/0092860 A1* | 5/2006 | Higashitaniguchi et al. . 370/255 |

FOREIGN PATENT DOCUMENTS

| JP | 3-162035 | 7/1991 |
| JP | 6-37764 | 2/1994 |

* cited by examiner

*Primary Examiner*—Chirag G Shah
*Assistant Examiner*—Steve Young
(74) *Attorney, Agent, or Firm*—Katten Muchin Roseman LLP

(57) ABSTRACT

A learning-target packet to be used for a path learning is selected from among a plurality of packets queued by a relay apparatus. A relationship between a transmission-source address and a first-arrival port for the selected learning-target packet is registered as learning information. A packet corresponding to the registered learning information is transferred to the first-arrival port pertaining to the learning information, and a packet that does not correspond to the learning information is transferred to all ports to which the packet is to be transferred.

16 Claims, 18 Drawing Sheets

FIG.3

| MAC TABLE | | |
|---|---|---|
| TRANSMISSION-SOURCE MAC ADDRESS | FIRST-ARRIVAL PORT | LEARNING TIME |
| 00-01-01-3E-74-A8 | 2 | t1 |
| 00-01-06-91-BD-C6 | 3 | t2 |
| ⋮ | ⋮ | ⋮ |

FIG.4

| COINCIDENCE-INFORMATION TABLE | |
|---|---|
| PACKET INFORMATION | STORING TIME |
| INTERNAL INFORMATION OF PACKET 1 | t1 |
| INTERNAL INFORMATION OF PACKET 2 | t2 |
| ⋮ | ⋮ |

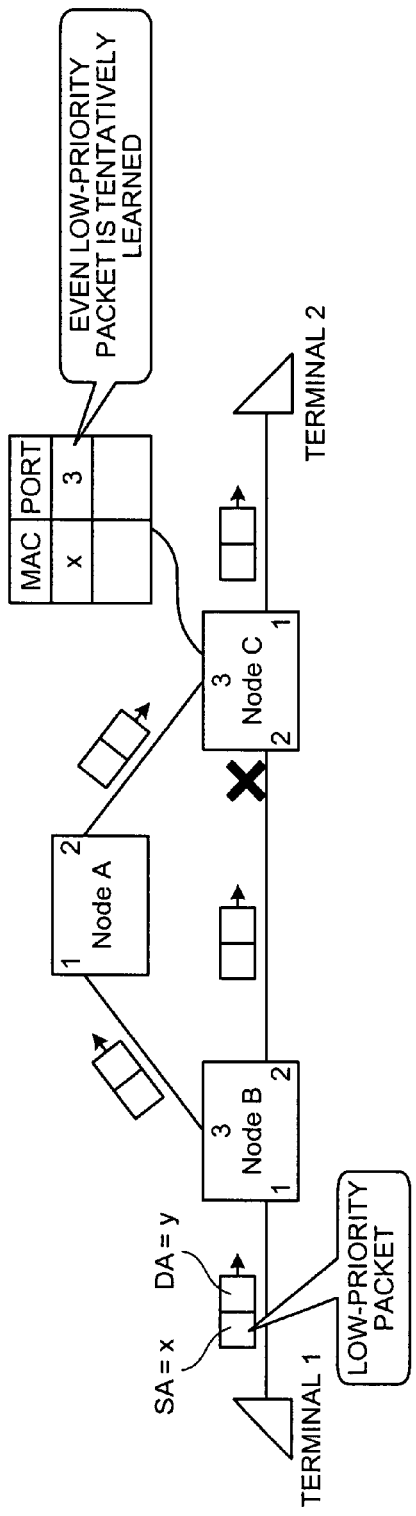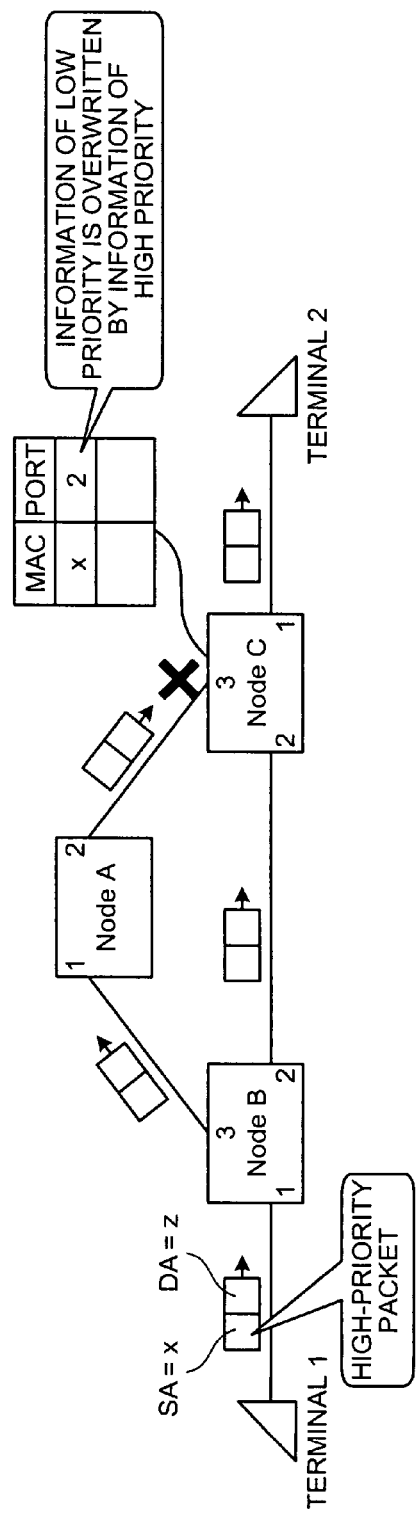

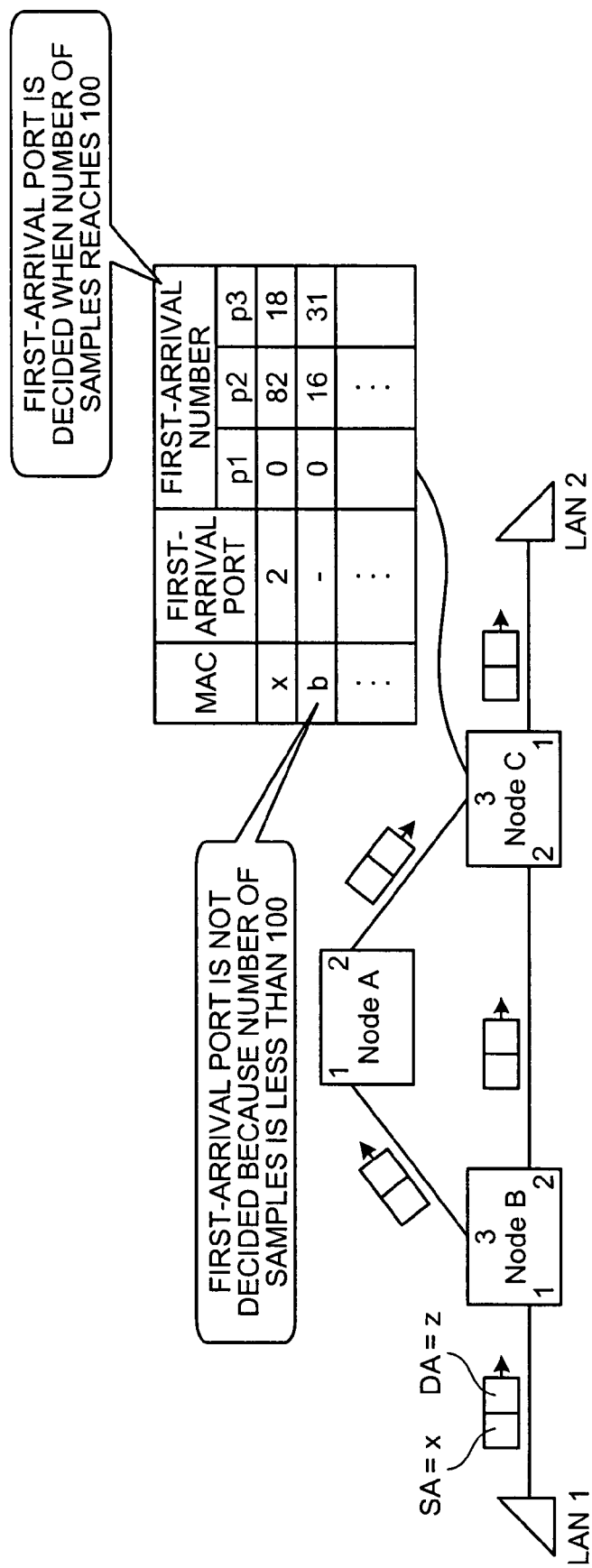

FIG.8

| MAC | PORT | LEARNING TIME |
|-----|------|---------------|
| x | 2 | t1 |
| b | 3 | t2 |
| ⋮ | ⋮ | ⋮ |

TIMER

EACH ENTRY HAS TIMER, AND PORT REWRITING IS NOT ALLOWED UNTIL TIMER RUNS OUT

FIG.9

| MAC | FIRST-ARRIVAL PORT | FIRST-ARRIVAL CANDIDATE | NUMBER OF ARRIVALS IN A ROW |
|-----|--------------------|-----------------------| ----------------------------|
| x | 2 | 3 | 4 |
| b | 3 | – | – |
| ⋮ | ⋮ | ⋮ | ⋮ |

THRESHOLD FOR CHANGING FIRST-ARRIVAL PORT

8

EACH ENTRY HAS FIRST-ARRIVAL CANDIDATE AND NUMBER OF ARRIVALS IN A ROW FOR EACH PORT, AND IF NUMBER OF ARRIVALS IN A ROW REACHES THE THRESHOLD, FIRST-ARRIVAL PORT IS CHANGED.

FIG.10

| MAC | FIRST-ARRIVAL PORT | FIRST-ARRIVAL PERCENTAGE | | |
|---|---|---|---|---|
| | | p1 | p2 | p3 |
| x | 2 | 0% | 20% | 80% |
| b | 3 | 0% | 10% | 90% |
| ⋮ | ⋮ | ⋮ | ⋮ | ⋮ |

THRESHOLD FOR CHANGING FIRST-ARRIVAL PORT

30%

EACH ENTRY HAS NUMBER OF ARRIVALS OF FIRST-ARRIVAL PACKET OR FIRST-ARRIVAL PERCENTAGE INFORMATION FOR EACH PORT, AND IF FIRST-ARRIVAL PERCENTAGE IS BELOW THRESHOLD, FIRST-ARRIVAL PORT IS CHANGED.

BECAUSE FIRST-ARRIVAL PERCENTAGE OF PORT 2 IS BELOW THRESHOLD (30%), FIRST-ARRIVAL PORT IS CHANGED TO "3"

FIG.11

| MAC | FIRST-ARRIVAL PORT | FIRST-ARRIVAL PERCENTAGE | | |
|---|---|---|---|---|
| | | p1 | p2 | p3 |
| x | 2 | 30% | 30% | 40% |
| b | 3 | 0% | 10% | 90% |
| ⋮ | ⋮ | ⋮ | ⋮ | ⋮ |

CONSTANT RATE

80%

BECAUSE FIRST-ARRIVAL PERCENTAGE OF PORT 2 IS BELOW A THRESHOLD (40% × 80%=32%), FIRST-ARRIVAL PORT IS CHANGED TO "3"

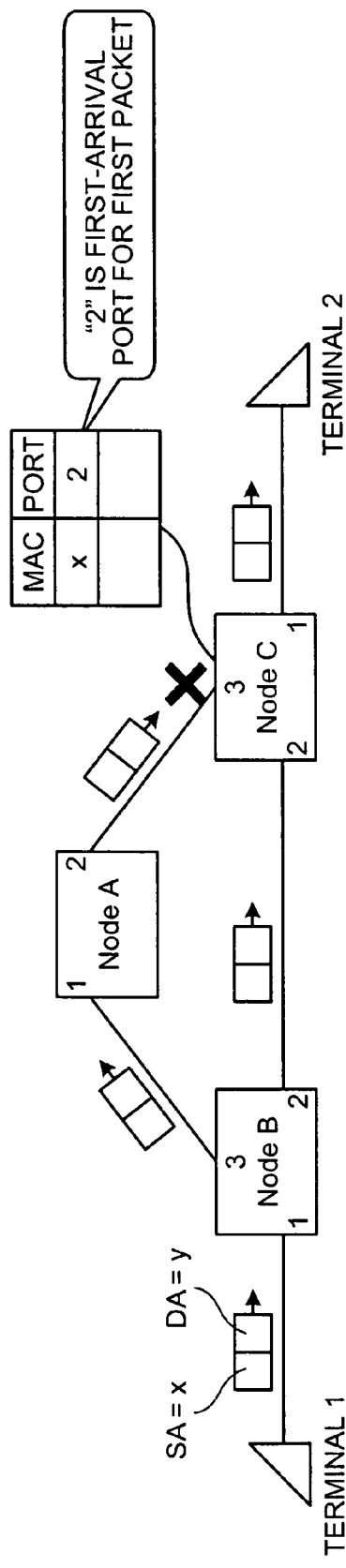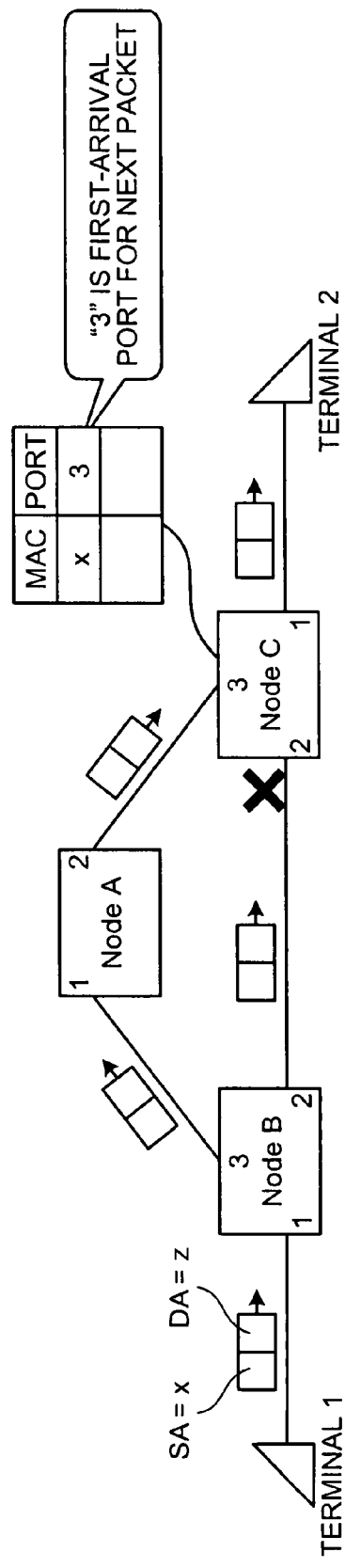

FIRST-ARRIVAL LEARNING METHOD, RELAY APPARATUS, AND COMPUTER PRODUCT

BACKGROUND OF THE INVENTION

1. Field of the Invention

The present invention relates to a technology for learning, as a first-arrival port, a port at which an identical packet that is transmitted through a plurality of paths by other relay apparatus arrives first in a relay apparatus that controls a path of a packet in a network through which packets are distributed.

2. Description of the Related Art

With a spread of a broadband Ethernet (Registered trademark) service, an advance of the Ethernet (Registered trademark) technology for a broadband network, such as a metro area network (MAN) and a wide area network (WAN), has become outstanding. As a relay apparatus that relays a data packet distributed on such a broadband network, a layer 2 switch (L2 switch) has got a lot of attention recently.

The L2 switch has a big merit of being less expensive compared to a router and can be used for all upper-layer protocols, which may make a further spread in the future. However, because the L2 switch is a relay apparatus originally intended for a local area network (LAN) without considering an to the broadband network such as the MAN, it has a few problems in terms of a system.

For example, when a path is controlled so that a packet is transmitted through an optimum path in a network in which a plurality of L2 switches are mutually connected, it may not be possible to select the optimum path depending on a physical configuration of the network even with employing a spanning-tree protocol (STP) defined as a network redundancy system of the Ethernet (Registered trademark) or a multiple spanning-tree protocol (MSTP) that is an extended system of the STP, which causes a problem of concentration of a network load on a specific path.

In addition, in a network employing the STP or the MSTP, the maximum hop count is limited to about 20 due to a limitation of the STP, which causes another problem of scalability implying that it is not possible to build a bigger size network.

To cope with the above problems with the STP and the MSTP, a so-called first-arrival-port learning method (hereinafter, "a first-arrival learning method") has been proposed (see, for example, Japanese Patent Application Laid-Open No. H3-162035 and Japanese Patent Application Laid-Open No. H6-37764). In the first-arrival learning method, an optimum path for transferring a packet is selected by learning a port having a shortest delay of the packet.

In other words, when an identical packet transmitted through a plurality of paths on a network by other relay apparatus (hereinafter, "an identical packet") arrives at a plurality of ports of a relay apparatus provided at a certain node, a port that first received the identical packet is learned as a first-arrival port for the identical packet. Then, a flooding (simultaneous distribution) of the identical packet arrived at the first-arrival port is performed to other ports, and at the same time, the identical packets arrived at the other ports are discarded.

However, the method disclosed in Japanese Patent Application Laid-Open No. H3-162035 and Japanese Patent Application Laid-Open No. H6-37764 is a basic concept of the first-arrival learning method, and only the basic concept cannot build a practical relay apparatus.

Because the first-arrival learning method is a method in which "a port at which a packet arrives first is considered as the first-arrival port", packets are transferred using a port having the shortest delay of the packet. However, the delay includes a so-called "queuing delay" that is apt to be influenced by a temporary congestion. Therefore, if the first-arrival port is learned when the queuing delay is temporarily increased on a path that is supposed to be the optimum path, a long path would be selected as the optimum path, which means that it is a problem in the first-arrival learning method how to ensure an accuracy of the optimum path.

In addition, when there is a plurality of paths having substantially same delays, the optimum path tends to be changed very often in the first-arrival learning method, because the path having the shortest delay is changed at frequent intervals due to an influence of the queuing delay that occurs by the temporary congestion. The frequent change of the optimum path (the first-arrival path) is not desirable because it may cause a reversal of a packet order, which means that it is another problem in the first-arrival learning method how to ensure a stability of the optimum path.

There is still another problem in the first-arrival learning method that, even when a failure occurs in a path (a link) or a relay apparatus (a node) that is related to the optimum path, the transfer of the packet is continuously performed to the optimum path once learned. Although it is possible to learn information again when a valid duration is expired with a setting of the valid duration for learned information, the transfer of the packet is still continued to a failed path until the valid duration passes off, which means that it is still another problem in the first-arrival learning method how to perform a reselection of the optimum path when a failure occurs.

From the above points of view, it is a major challenge how to realize a first-arrival leaning method having a capability of ensuring accuracy and stability of the optimum path, and a relay apparatus and a program for the relay apparatus to which the first-arrival leaning method is applied.

SUMMARY OF THE INVENTION

It is an object of the present invention to at least partially solve the problems in the conventional technology.

A first-arrival learning method according to one aspect of the present invention is for learning, as a first-arrival port, a port at which an identical packet that is transmitted through a plurality of paths by other relay apparatus arrives in a relay apparatus that controls a path of a packet in a network through which packets are distributed. The first-arrival learning method includes selecting a learning-target packet to be used for a path learning from among a plurality of packets queued by the relay apparatus; registering a relationship between a transmission-source address and the first-arrival port for the learning-target packet selected at the selecting, as learning information; and packet transferring including transferring a packet corresponding to the learning information registered at the registering to the first-arrival port pertaining to the learning information, and transferring a packet that does not correspond to the learning information to all ports to which the packet is to be transferred.

A relay apparatus according to another aspect of the present invention controls a path of a packet in a network through which packets are distributed, and learns, as a first-arrival port, a port at which an identical packet that is transmitted through a plurality of paths by other relay apparatus arrives first. The relay apparatus includes a learning-target selecting unit that selects a learning-target packet to be used for a path learning from among a plurality of packets queued by the relay apparatus; a learning-information registering unit that registers a relationship between a transmission-source address and the first-arrival port for the learning-target packet selected by the learning-target selecting unit, as learning information; and a packet transferring unit that transfers a packet corresponding to the learning information registered by the learning-information registering unit to the first-arrival port pertaining to the learning information, and transfers a packet that does not correspond to the learning information to all ports to which the packet is to be transferred.

A computer-readable recording medium according to still another aspect of the present invention stores therein a computer program for a relay apparatus that controls a path of a packet in a network through which packets are distributed, and learns, as a first-arrival port, a port at which an identical packet that is transmitted through a plurality of paths by other relay apparatus arrives first. The computer program causes a computer to execute selecting a learning-target packet to be used for a path learning from among a plurality of packets queued by the relay apparatus; registering a relationship between a transmission-source address and the first-arrival port for the learning-target packet selected at the selecting, as learning information; and packet transferring including transferring a packet corresponding to the learning information registered at the registering to the first-arrival port pertaining to the learning information, and transferring a packet that does not correspond to the learning information to all ports to which the packet is to be transferred.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of a media-access-control (MAC) table;

FIG. 4 is an example of a coincidence-information table;

FIG. 5A is a schematic diagram for illustrating an update of learning information based on a service class, where a flooding of a low-priority packet is performed;

FIG. 5B is a schematic diagram for illustrating an update of learning information based on a service class, where a flooding of a high-priority packet is performed after the low-priority packet;

FIG. 7 is a schematic diagram for illustrating a method of determining a first-arrival port based on statistic information;

FIG. 8 is a schematic diagram for illustrating a method of determining a first-arrival port based on a learning time and a timer;

FIG. 9 is a schematic diagram for illustrating a method of determining a first-arrival port based on the number of packets arrived in a row;

FIG. 10 is a schematic diagram for illustrating a method of determining a first-arrival port based on a first-arrival percentage;

FIG. 11 is a schematic diagram for illustrating a method of determining a first-arrival port based on a ratio between the first-arrival percentages;

FIG. 21A is a schematic diagram for illustrating an instability of a first-arrival port, which is a problem in the conventional technology, where the first-arrival port is learned at a time of receiving a flooding packet of SA=x; and FIG. 21B is a schematic diagram for illustrating an instability of a first-arrival port, which is a problem in the conventional technology, where the flooding packet of SA=x arrives at other port.

DETAILED DESCRIPTION OF THE PREFERRED EMBODIMENTS

Exemplary embodiments of the present invention will be explained in detail below with reference to the accompanying drawings. The following explanation is for a case in which the first-arrival learning method according to the present invention is applied to a relay apparatus. To make a unique feature of the first-arrival learning method according to the present invention clear, a first-arrival learning method according to a conventional technology will be explained first, and various functions of the first-arrival learning method according to the present invention will be explained (a first embodiment) followed by an example of a combination of the functions (a second embodiment).

Figure 19:
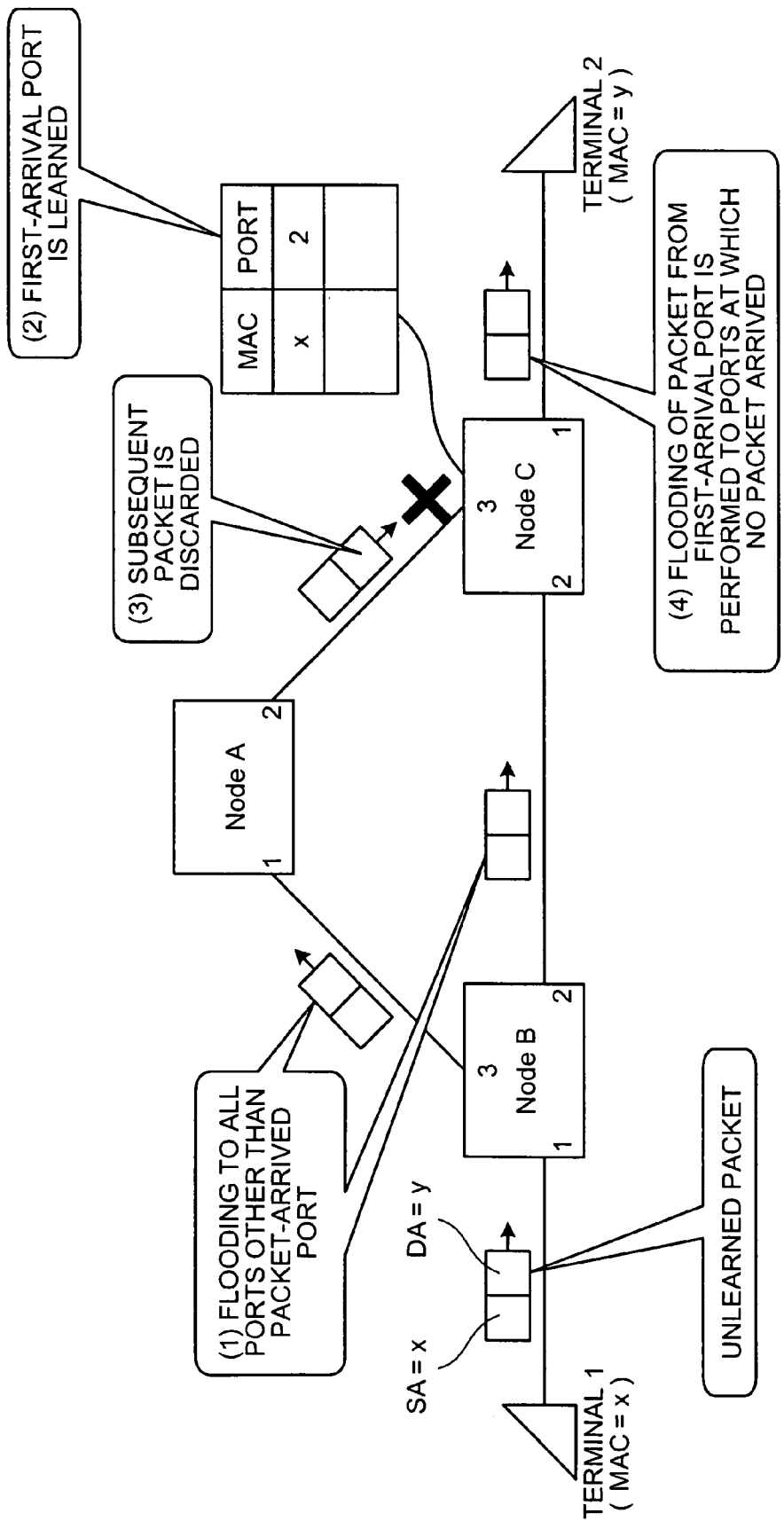
FIG. 19 is a schematic diagram for illustrating an operation of a network when an unlearned packet is received in a first-arrival learning method according to a conventional technology.
Figure 20:
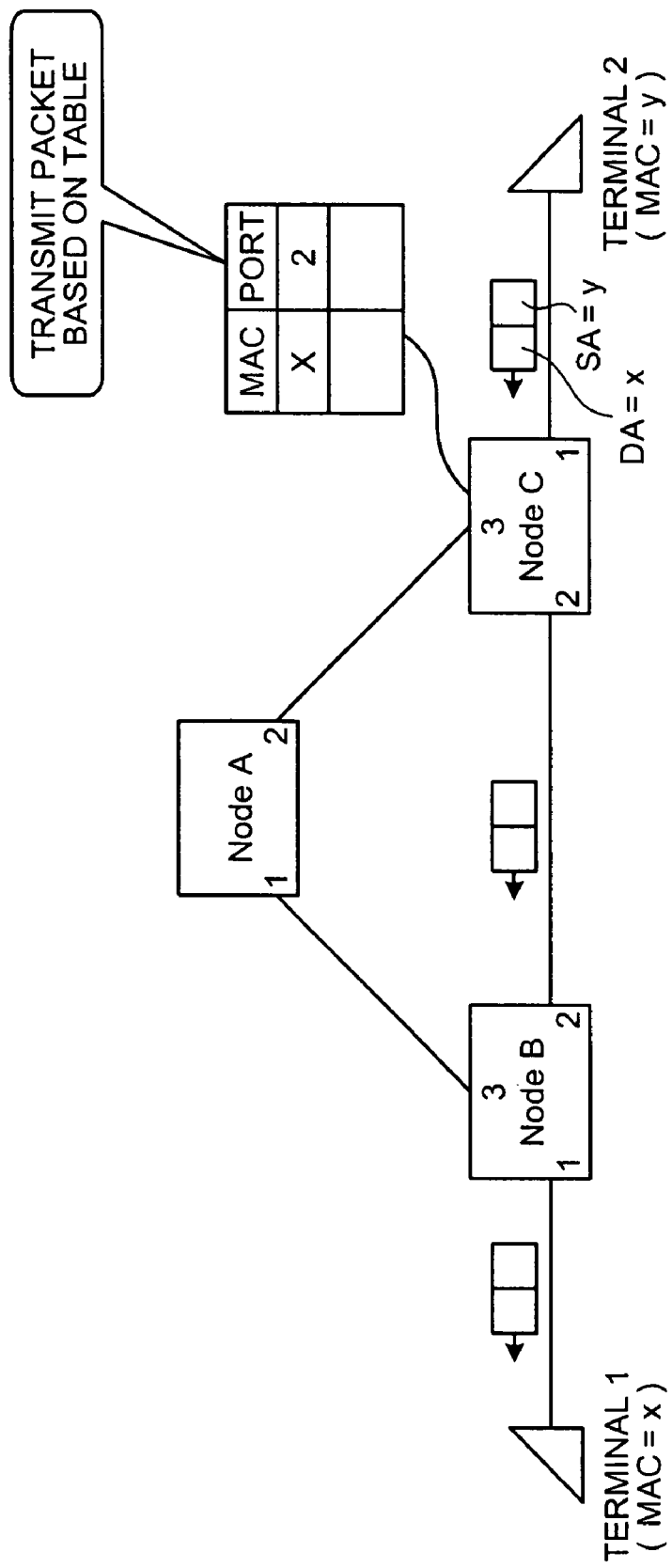
FIG. 20 is a schematic diagram for illustrating an operation of the network when a learned packet is received in the first-arrival learning method according to the conventional technology.

FIG. 19 is a schematic diagram for illustrating an operation of a network when an unlearned packet is received in a first-arrival learning method according to a conventional technology. FIG. 20 is a schematic diagram for illustrating an operation of the network when a learned packet is received in the first-arrival learning method according to the conventional technology. A node shown in FIG. 19 and FIG. 20 (such as a Node A and a Node B) is a relay apparatus such as an L2 switch, which performs a path control for a packet exchanged between a terminal 1 and a terminal 2.

As shown in FIG. 19, in the first-arrival learning method according to the conventional technology, when a node receives a packet for which a transmission-destination identifier (for example, a physical address) is not learned, the node performs a flooding (simultaneous distribution) of the received packet to the other ports. In this case, the ports to which the flooding is performed are data ports. Control ports are not included in the candidates for the flooding. If an unlearned identical packet arrives at a plurality of ports at a certain node, a forwarding process is performed only for a first-arrived packet, and a port at which the packet arrived first (first-arrival port) is learned by storing the port with a transmission-source identifier of the packet in an address table.

On the other hand, a node that received a learned packet, as shown in FIG. 20, transfers the received packet to other node based on the address table in which the port is learned for the packet, as in the case of an ordinary Ethernet (Registered trademark) switch.

The basic concept of the first-arrival learning method as described above is disclosed in Japanese Patent Application Laid-Open No. H3-162035 and Japanese Patent Application Laid-Open No. H6-37764. However, only the disclosed basic concept cannot build a practical relay apparatus.

In other words, because the first-arrival learning method is a method in which "a port at which a packet arrives first is considered as the first-arrival port", packets are transferred using a port having the shortest delay of the packet. In general, when there are a number of hope counts in a network or when a narrow-bandwidth line is included in the network, it can be said that the method is reasonable with the broad outline because a delay is relatively large in the network. However, a so-called "queuing delay", which is one of the major factors of the delay, is changed greatly depending on a situation of a temporary congestion from time to time. The queuing delay means a delay time from when a packet is queued in a queue of a relay apparatus until when the packet is output from the queue.

For instance, when a path that is supposed to be the optimum path is temporarily congested, a packet that passed the congested path becomes a later-arrived packet because of an influence of the queuing delay, and as a result, the path that is supposed to be the optimum path is not selected as the first-arrival path. In this way, in the first-arrival learning method according to the conventional technology, there is a problem of a low accuracy in selecting the optimum path. In addition, there is another problem of a low stability of the optimum path due to a point that the queuing delay is not taken into account.

FIG. 21A and FIG. 21B are schematic diagrams for illustrating an instability of the first-arrival port, which is a problem in the conventional technology. For instance, if a flooding packet in which the transmission-source address (SA) is set to "x" and the transmission-destination address (DA) is set to "y" arrives at a port 2 of a Node C, as shown in FIG. 21A, the first-arrival port of SA=x is learned as the port 2 in the Node C. When a learning is performed in this way, even if the identical flooding packet arrives later at a port 3 of the Node C, the later-arrived packet is discarded.

However, as shown in FIG. 21B, when other flooding packet (SA=x, DA=z) having different contents from the flooding packet shown in FIG. 21A is distributed on the network, and if the other packet arrives first at the port 3 of the Node C, the first-arrival port of SA=x in the Node C is changed to the port 3. If the change of the first-arrival port is frequently occurred in this way, a transmission port for a unicast packet having DA=x becomes changed accordingly, a reversal of a packet order would happen frequently, which is not desirable.

In addition, in the first-arrival learning method according to the conventional technology, when a failure occurs at a path (link) or a relay apparatus (node), a transfer of a packet is continuously performed to the optimum path that is once learned. Although it is possible to learn information again when a valid duration is expired with a setting of the valid duration for learned information, the transfer of the packet is still continued to the failed path (a port connected to the path) until the valid duration passes off.

In this way, the first-arrival learning method according to the conventional technology has a problem in terms of the accuracy and the stability of the optimum path, and at the same time, has another problem in terms of a swift action for reselecting the optimum path when a failure occurs. The first-arrival learning method according to the present invention is for coping with the above problems.

Figure 1:
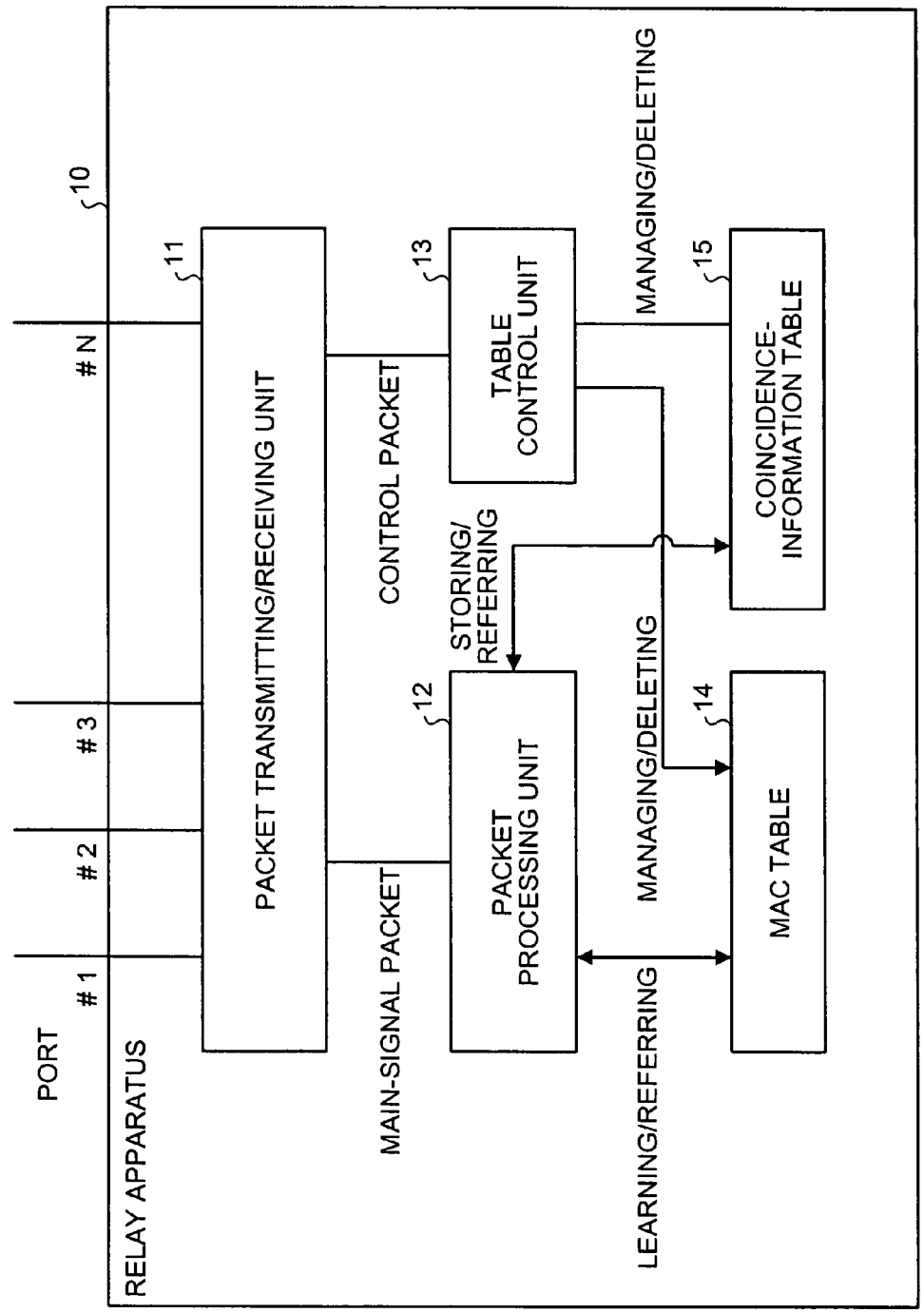
FIG. 1 is a block diagram for illustrating a configuration of a relay apparatus according to a first embodiment of the present invention.

First of all, a configuration and a basic operation of a relay apparatus to which the first-arrival learning method according to the present invention is applied will be explained with reference to FIG. 1 to FIG. 4. FIG. 1 is a block diagram for illustrating the configuration of a relay apparatus 10 according to a first embodiment of the present invention. As shown in FIG. 1, the relay apparatus 10 includes N number of ports, a packet transmitting/receiving unit 11, a packet processing unit 12, a table control unit 13, a media-access-control (MAC) table 14, and a coincidence-information table 15.

The packet transmitting/receiving unit 11 performs a process pertaining to a transmission and a reception of a packet that is exchanged through each of the ports, such as a capsuling of the packet. A data packet of a main signal is passed over to the packet processing unit 12 via the packet transmitting/receiving unit 11. In addition, the packet transmitting/receiving unit 11 passes over a control packet to the table control unit 13.

The packet processing unit 12 performs a forwarding process of a packet and a determination of a coincidence between packets. In other words, upon receiving a packet, the packet processing unit 12 first accesses the coincidence-information table 15 to determine whether an identical packet has already arrived.

Upon determining that the identical packet has already arrived, the packet processing unit 12 considers the newly received packet as a later-arrived packet, and discards the newly received packet. On the other hand, upon determining that the identical packet has not yet arrived, the packet processing unit 12 registers packet information on the newly received packet to the coincidence-information table 15. A detailed processing procedure that is performed by the packet processing unit 12 will be explained later with reference to FIG. 2.

The table control unit 13 performs a management and a deleting process of a corresponding record in the MAC table 14 and the coincidence-information table 15 based on the control packet received via the packet transmitting/receiving unit 11.

The MAC table 14 manages learning information on a transmission source of a first-arrived packet. FIG. 3 is an example of the MAC table 14. As shown in FIG. 3, the MAC table 14 includes items of a transmission-source MAC address for uniquely identifying a transmission source, a first-arrival port indicating a number of a port that received the first-arrived packet, and a learning time indicating a time at which the first-arrived packet was learned.

The coincidence-information table 15 manages either one of a content of the first-arrived packet and information obtained by processing the content of the first-arrived packet, to be used for a determination of coincidence between the first-arrived packet and a later-arrived packet. The coincidence-information table 15 includes items of packet information indicating the content of the first-arrived packet and a storing time indicating a time at which the packet information was stored. Regarding the content of the packet information, there is no special limitation.

FIG. 4 is an example of the coincidence-information table 15. As shown in FIG. 4, internal information of a packet is stored in the field of the packet information, and a time of storing the packet information is stored in the field of the storing time.

Figure 2:
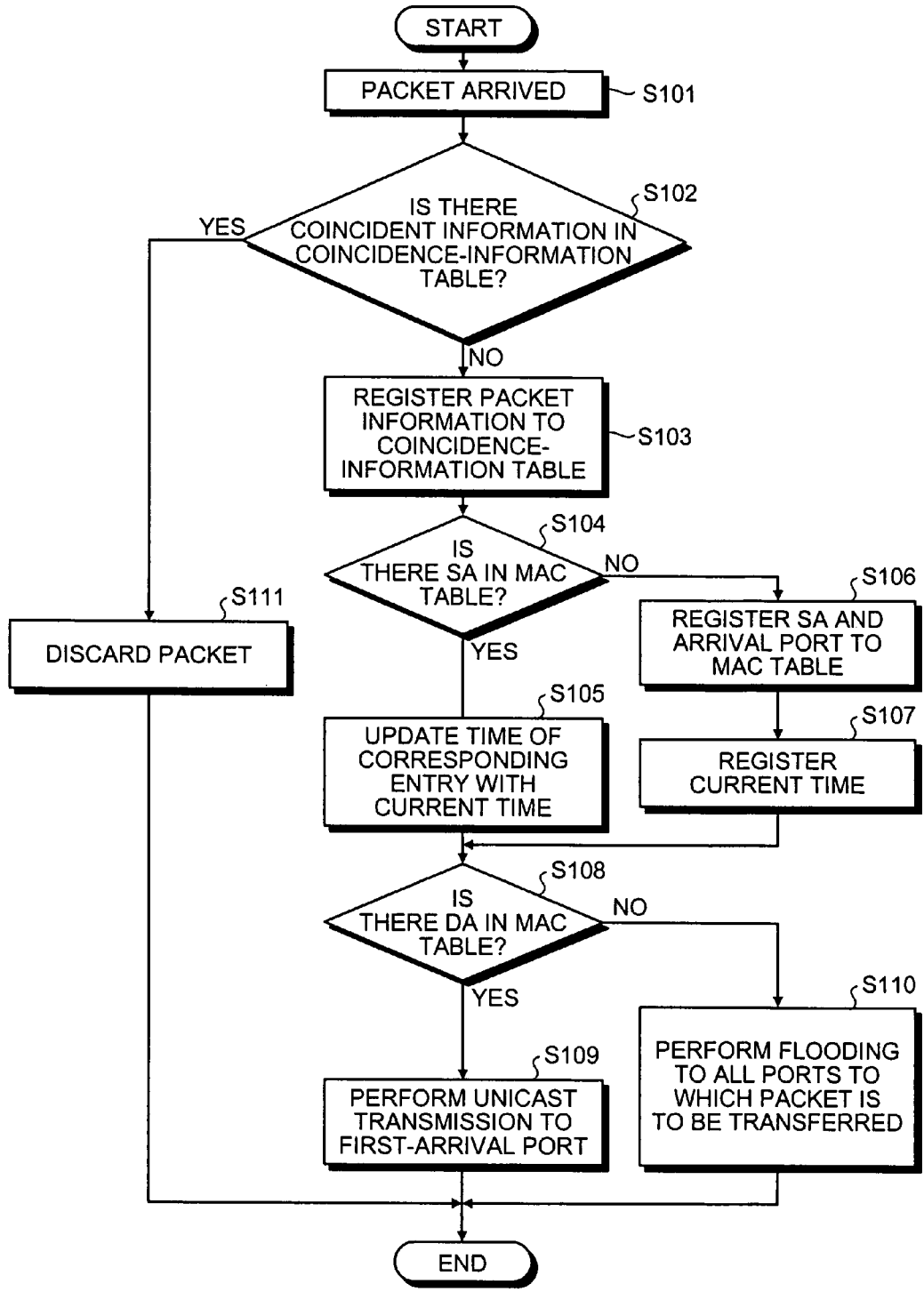
FIG. 2 is a flowchart of a processing procedure of a packet processing unit.

FIG. 2 is a flowchart of a processing procedure of the packet processing unit 12. As shown in FIG. 2, when a packet arrives at a port (Step S101), the packet processing unit 12 determines whether there is coincident information in the coincidence-information table 15 (Step S102). When there is no coincident information in the coincidence-information table 15 ("NO" at Step S102), the packet processing unit 12 registers packet information on the packet arrived at Step S101 to the coincidence-information table 15 (Step S103).

Subsequently, the packet processing unit 12 determines whether a transmission-source address (SA) is stored in the MAC table 14 (Step S104), and when the SA is stored in the MAC table 14 ("YES" at Step S104), updates a time of a corresponding entry to a current time (Step S105). On the other hand, when the SA does is not stored in the MAC table 14 ("NO" at Step S104), registers the SA and an arrival port to the MAC table 14 (Step S106), and at the same time, registers the current time (Step S107).

After performing the above processes, the packet processing unit 12 determines whether a transmission-destination address (DA) is stored in the MAC table 14 (Step S108), and the DA is stored in the MAC table 14 ("YES" at Step S108), performs a unicast transmission to the first-arrival port (Step S109), and ends the process. On the other hand, when the DA is not stored in the MAC table 14 ("NO" at Step S108), performs a flooding of the packet to all ports to which the packet is to be transferred (Step S110), and ends the process. In this case, if the ports are grouped in units of network, such as a virtual LAN (VLAN), the packet processing unit 12 performs the flooding only to ports belonging to the same group to which the arrival port of the packet belongs. In other words, when the DA is not stored in the MAC table 14 ("NO" at Step S108), the packet processing unit 12 performs the flooding to all ports of a broadcast domain from among the ports to which the packet is to be transferred. When it is determined that there is coincident information in the coincidence-information table 15 at Step S102 ("YES" at Step S102), the, packet processing unit 12 discards the packet (Step S111), and ends the process.

Regarding "the accuracy of the optimum path", which is one of the problems in the first-arrival learning method according to the conventional technology, a method adopted in the relay apparatus 10 according to the first embodiment to improve the accuracy of the optimum path will be explained. A total delay at a time of transferring a packet is expressed by "total delay=transmission delay+packet processing delay+queuing delay". The queuing delay is, as describe above, a uncertain factor that depends on a temporary congestion, and has a great influence on selecting an optimum path.

An ideal method to cope with the queuing delay is to remove the influence of the temporary congestion. However, from a practical point of view, a method of reducing the queuing delay is roughly classified into two: One is to reduce the queuing delay itself; and the other is to reduce a proportion of the queuing delay to the total delay.

First of all, as the method of reducing the queuing delay itself, a method in which a packet having a small queuing delay from the beginning is taken as a learning-target packet can be considered. For instance, when there is a plurality of service classes (classes indicating a transfer priority) in packets that are distributed on a network, because a packet having a high priority is transferred in priority, it has a low possibility of being influenced by the queuing delay. Therefore, when performing a learning of a first-arrival port (including an update of the first-arrival port), the learning can be performed by according a high-priority class priority over other classes.

FIG. 5A and FIG. 5B are schematic diagrams for illustrating an update of learning information based on the service class. As shown in FIG. 5A, when a low-priority packet arrives at a port 3 of a Node C in an unlearned state, the table control unit 13 updates information of the MAC table 14 based on the low-priority packet. When a high-priority packet having the same SA arrives at a port 2 of the Node C later on, as shown in FIG. 5B, the information of the MAC table 14 is updated to the port that received the high-priority packet (port 2).

In the example shown in FIG. 5A and FIG. 5B, a case in which the high-priority packet is learned in priority by updating, based on the high-priority packet, the MAC table 14 that has been updated based on the low-priority packet. However, the scheme is not limited to the above example. For instance, a weighting method can be performed in which one high-priority packet is taken as a plurality of low-priority packets. In addition, the high-priority class can be learned in priority by excluding the low-priority packet from the learning-target packet. In this case, the packet processing unit 12 holds a threshold of the service class, and excludes a packet of a service class that is smaller than the threshold from the learning target.

In this way, when there is a plurality of service classes in packets that are distributed on a network, a high-priority class can be learned in priority over other classes. However, when processing a packet that does not have the service class, the method can be modified in such a manner that a packet for which reading of the packet is performed in priority is defined, and first-arrival information of the corresponding packet is processed in priority.

There are two types of packets in the packets that are distributed on a network: a packet that is flooded (a flooding packet) and a packet that is not flooded. The flooding packet includes a broadcast packet, a multicast packet, and an Unknown packet. On the other hand, as the packet that is not flooded, there is a unicast packet of which the MAC address is learned.

Based on the flooding state, reading of the flooding packet can be processed in priority, and a transfer of the flooding packet can be performed earlier than the unicast packet that is not flooded. In this way, even when processing a packet that does not have a service class, it is possible to suppress the influence of the queuing delay.

Figure 6A:
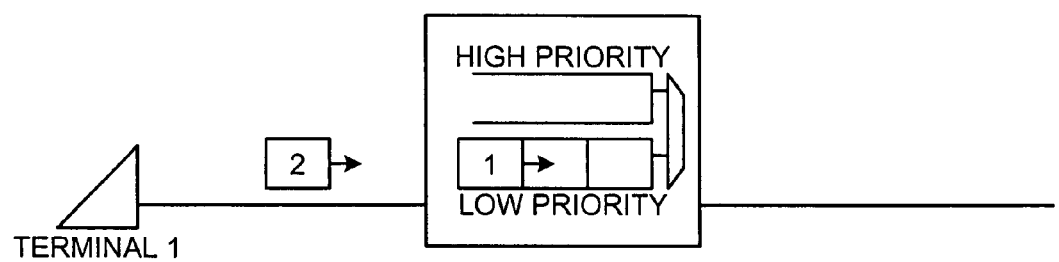
FIG. 6A is a schematic diagram for illustrating an example of a reversal of a packet order, where a MAC learning is already done when a packet 1 arrives.
Figure 6B:
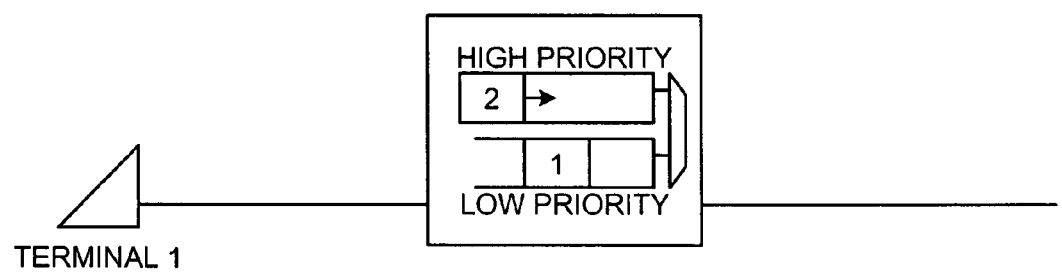
FIG. 6B is a schematic diagram for illustrating an example of a reversal of a packet order, where a MAC address is aging before a packet 2 arrives.
Figure 6C:
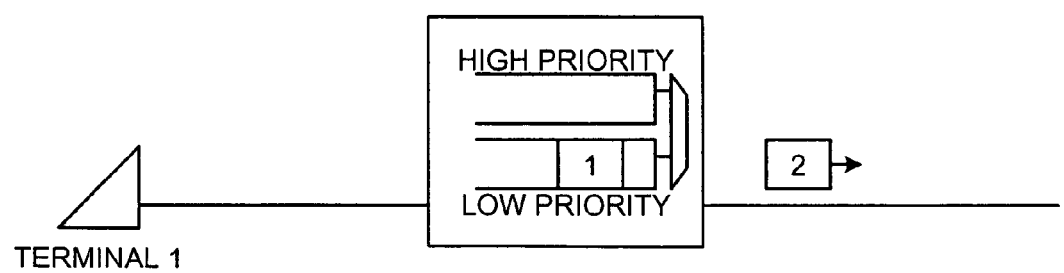
FIG. 6C is a schematic diagram for illustrating an example of a reversal of a packet order, where the packet 2 is read out first.

However, if every flooding packet is processed in priority, there is a possibility of causing another problem of a reversal of a packet order. FIG. 6A to FIG. 6C are schematic diagrams for illustrating an example of the reversal of the packet order. It is assumed that there is a data flow of a user (terminal 1), and when a packet 1 arrives at a port, there is an entry in the MAC table 14. In this case, because the packet 1 is an ordinary unicast packet, it is buffered in a low-priority queue (see FIG. 6A).

However, if the entry became aging before a packet 2 arrives, a packet having the corresponding MAC address would be handled as an Un-known packet (one of the flooding packets) from the time of aging, and the packet 2 is buffered in a high-priority queue (see FIG. 6B).

If the low-priority queue is congested at this time, the packet 2 is read out ahead of the packet 1 (see FIG. 6C). In this way, if a packet that is included in a data flow is included in a priority target, there is a possibility of reversing a packet order in the data flow.

Therefore, if only a priority of a packet that is not included in a data flow, i.e., a protocol control packet becomes high, and if the learning information is updated based on the first-arrival information of the protocol control packet of which the priority became high, it is possible to suppress an occurrence of the reversal of the packet order. As the protocol control packet, there is, for example, an address-resolution-protocol (ARP) packet.

The ARP packet is a protocol control packet that searches a MAC address using an Internet-protocol (IP) address as a key. In addition, because the protocol control packet functions as an independent packet, even with the reversal of the packet order, it does not influence on an upper-layer protocol, unlike a packet that is included in a data flow.

A method of reducing the proportion of the queuing delay to the total delay is to reduce the influence of the queuing delay by using a statistic characteristic. An influence of a temporary congestion is great if an attention is focused on a single packet; however, if an average of, for example, 100 packets is taken, the influence of the temporary congestion becomes small.

In other words, by replacing the above expression on the total delay, "total delay=transmission delay+packet processing delay+queuing delay", with "average total delay=average transmission delay+average packet processing delay+average queuing delay", it is possible to reduce the proportion of the queuing delay to the total delay.

FIG. 7 is a schematic diagram for illustrating a method of determining a first-arrival port based on the statistic information. As shown in FIG. 7, the first-arrival port is not determined until the number of samples of the flooding packet reaches a predetermined number (for example, 100 samples), and when the number of samples of the flooding packet reaches the predetermined number, a port having the largest number of first-arrival packets is determined as the first-arrival port. Although the statistic information focusing on the number of packets is employed in the example shown in FIG. 7, by measuring a difference between arrival times of the packets, a port having a statistically shortest arrival time can be determined as the first-arrival port.

Regarding "the stability of the optimum path", which is another problem in the first-arrival learning method according to the conventional technology, a method adopted in the relay apparatus 10 according to the first embodiment to improve the stability of the optimum path will be explained. To stabilize the optimum path, it is required that the first-arrival port is not changed frequently. To keep the first-arrival port from being changed frequently, a predetermined condition can be set regarding a change of the first-arrival port.

For instance, it is possible to suppress the change of the first-arrival port by setting "a time" as the condition. Specifically, it is prohibited to change the first-arrival port that is registered to the MAC table 14 within a predetermined time. FIG. 8 is a schematic diagram for illustrating a method of determining the first-arrival port based on a learning time and a timer.

As shown in FIG. 8, each of the entries in the MAC table 14 holds a timer that is activated when a new address is learned or when a change of the first-arrival port is performed. Even when a condition of changing the first-arrival port is satisfied (for example, see FIG. 5B), the first-arrival port is not changed until the timer runs out.

In addition, it is also possible to suppress the change of the first-arrival port by taking "the number of packets" instead of the time as the condition. Specifically, the first-arrival port is changed when N number of packets arrived at a packet other than the current first-arrival port in a row. FIG. 9 is a schematic diagram for illustrating a method of determining the first-arrival port based on the number of packets arrived in a row.

As shown in FIG. 9, each of the entries in the MAC table 14 includes items of "a first-arrival port candidate (a first-arrival candidate)" and "the number of arrivals in a row (consecutive number of arrivals)". When a flooding packet first arrives at a port that is different from the first-arrival port, the port is registered as the first-arrival port candidate, and the number of arrivals in a row is set to "1".

When a packet further arrives at the same port, the number of arrivals in a row is incremented. In this way, when the number of arrivals in a row reaches a predetermined threshold for changing the first-arrival port ("8" in the example shown in FIG. 9), the port that is registered as the first-arrival port candidate is set to a new first-arrival port. On the other hand, if a flooding packet arrives at a port other than the first-arrival port candidate, the number of arrivals in a row becomes reset.

Furthermore, it is also possible to suppress the change of the first-arrival port by taking "statistic number of packets" instead of the number of packets as the condition. FIG. 10 is a schematic diagram for illustrating a method of determining the first-arrival port based on a first-arrival percentage. As shown in FIG. 10, each of the entries in the MAC table 14 includes "a first-arrival percentage" indicating a percentage or the number of arrivals of the first-arrival packet segmented for every port. When the first-arrival percentage of the current first-arrival port is below a predetermined threshold for changing the first-arrival port (30% in the example shown in FIG. 10), a change of the first-arrival port is performed.

For instance, in the example shown in FIG. 10, the current first-arrival port is a port 2 in the entry of which the MAC address is "x". However, because the first-arrival percentage of the port 2 is 20%, which is below the threshold of 30%, a port 3 having the largest first-arrival percentage is selected as a new first-arrival port.

Although the first-arrival port is determined based on the first-arrival percentage in the example shown in FIG. 10, it is also possible to determine the first-arrival port based on a ratio between the first-arrival percentages. FIG. 11 is a schematic diagram for illustrating a method of determining the first-arrival port based on the ratio between the first-arrival percentages. Specifically, when a ratio of the first-arrival percentage of the current first-arrival port to the largest first-arrival percentage from among the first-arrival percentages of the other ports is below a predetermined constant rate, the port having the largest first-arrival percentage is determined to be a new first-arrival port.

As shown in FIG. 11, a case in which the constant rate is set to 80%, and the first-arrival percentage of the current first-arrival port (port 2) is decreased to 30% is explained. In this case, because the port having the largest first-arrival percentage is a port 3 from among the ports other than the first-arrival port, a value obtained by multiplying the first-arrival percentage of the port 3 (40%) by the constant rate (80%) is a threshold for changing the first-arrival port, which is 40%×

80%=32%. The first-arrival percentage of the port 2 (30%) is below the threshold (32%), and therefore, the port 3 is selected as a new first-arrival port.

The method of determining the first-arrival port based on the ratio between the first-arrival percentages (see FIG. 11) has a following merit over the method determining the first-arrival port based on the first-arrival percentage (see FIG. 10). When the threshold is set to 30% in the method shown in FIG. 10, if the first-arrival percentages of all of the ports are around 20%, because the first-arrival percentage of the first-arrival port is always below the threshold, the first-arrival port is changed every time a top of the first-arrival percentage is changed.

On the contrary, with the method shown in FIG. 11, even if the first-arrival percentages of all of the ports are around 20%, if the constant rate is set to, for example, 80%, the threshold for changing the first-arrival port is 20%×80%=16%. Therefore, once the first-arrival port is determined, a change of the first-arrival port is not performed until the first-arrival percentage becomes below 16%, and it is possible to suppress a frequent change of the first-arrival port.

Although methods of updating the first-arrival port based on the statistic information and the time were explained in the examples shown in FIG. 7 to FIG. 11, it is also possible to make a setting not to allow a change of the first-arrival port once learned. With this scheme, it is possible to completely prevent an unnecessary change of the first-arrival port.

Regarding "the swift action for reselecting the optimum path at a time of a failure", which is still another problem in the first-arrival learning method according to the conventional technology, a method adopted in the relay apparatus 10 according to the first embodiment to promptly reselect the optimum path when a failure occurs will be explained.

When a failure occurs at a path (link) or a relay apparatus (node) on a network, it is necessary to promptly delete a path that passes through a point of the failure from the MAC table 14 because the point of the failure becomes disabled. For instance, in the STP, the system notifies a failure by transmitting a bridge protocol data unit (BPDU) with a topology change (TC) flag set, and path information related to a point of the failure is deleted from a MAC table of a relay apparatus (node).

In the first-arrival learning method, a similar process can be implemented by defining a control packet for deleting a point of a failure from the MAC table 14, and performing a flooding of the control packet when a failure occurs. Upon receiving the control packet, the table control unit 13 deletes a corresponding field from the MAC table 14. As for the control packet, the BPDU can be used as it is. In other words, upon receiving a BPDU with the TC flag set, the table control unit 13 deletes a corresponding field from the MAC table 14 in which the first-arrival port is learned.

In addition, the corresponding field can be deleted from the MAC table 14 without using the control packet. For instance, a flooding of a main signal packet having a tag indicating a notification of a failure is performed, and upon receiving the main signal packet with the tag, the packet processing unit 12 deletes the corresponding field from the MAC table 14.

As described above, according to the first embodiment, when a packet arrives, a packet processing unit determines whether there is coincident information in a coincidence-information table. After that, when there is no coincident information in the coincidence-information table, packet information is registered to the coincidence-information table, and a determination of coincidence of a packet is performed based on the packet information that is registered to the coincidence-information table. In addition, for learning information pertaining to a first-arrival port to be stored in a MAC table, a learning-target packet is identified, and a change of the first-arrival port is performed based on a time or statistic information. With this configuration, an accuracy and a stability of an optimum path can be ensured.

According to a second embodiment of the present invention, a combination of various functions of the first-arrival learning method according to the first embodiment will be explained with reference to FIG. 12 to FIG. 18. According to the second embodiment, the "method of suppressing the queuing delay itself by reading out a flooding packet in priority" is adopted as the method to improve the accuracy of the optimum path, the "method of determining the first-arrival port based on the first-arrival percentage" is adopted as the method to improve the stability of the optimum path, and the "method of using the BPDU in the STP" is adopted as the method of performing a swift action for reselecting the optimum path at a time of a failure.

As for the determination of the packet coincidence at a time of learning the first-arrival port, a check of a frame check sequence (FCS) of the Ethernet (Registered trademark) is performed. The "threshold for changing first-arrival port" shown in FIG. 10 is set to 40%.

Figure 12:
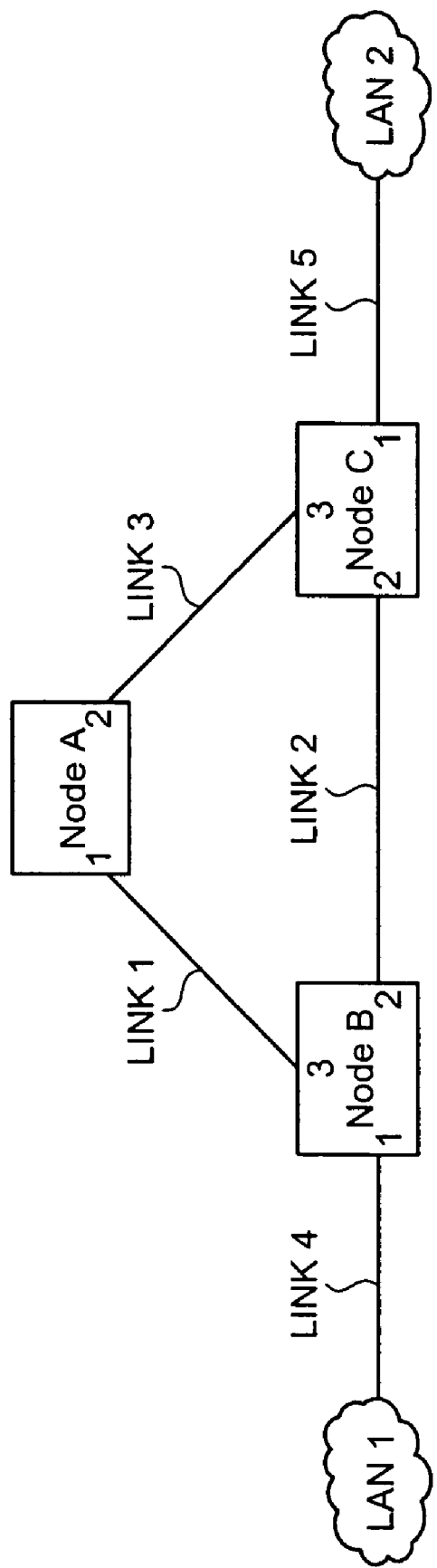
FIG. 12 is a schematic diagram for illustrating a configuration of a network according to a second embodiment of the present invention.

FIG. 12 is a schematic diagram for illustrating a configuration of a network according to the second embodiment. As shown in FIG. 12, a Node A, a Node B, and a Node C are connected via a Link 1, a Link 2, and a Link 3 on the network. The Node B is connected to a LAN 1 via a link 4, and the Node C is connected to a LAN 2 via a Link 5. Each of the Node A, the Node B, and the Node C is configured with the relay apparatus 10. In addition, the LAN 1 and LAN 2, and the Node A to Node C are assumed to belong to the same network group, such as the VLAN. Therefore, with respect to the port 1 of the Node B, for example, the port 2 and the port 3 of the Node B are ports of the broadcast domain.

Figure 13:
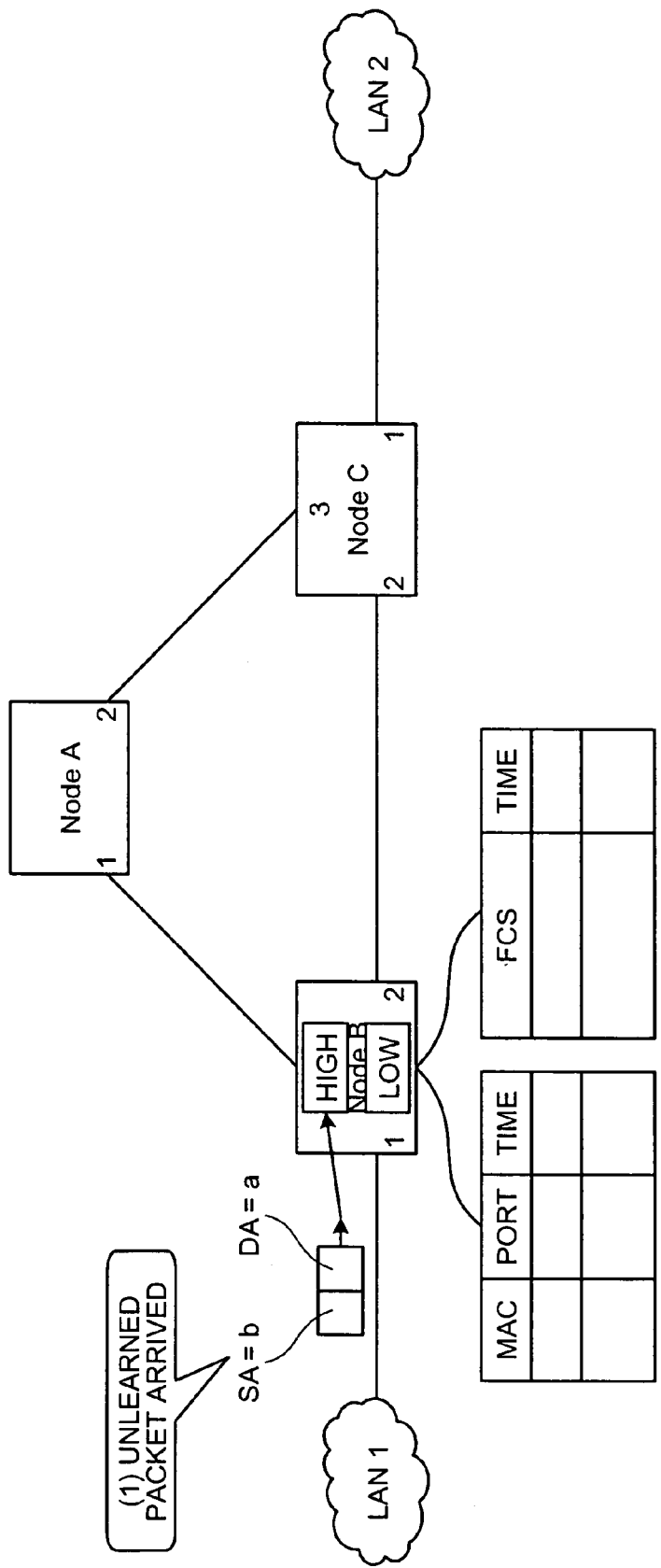
FIG. 13 is a schematic diagram for illustrating an operation of the network when an unlearned packet arrives at a node B.

FIG. 13 is a schematic diagram for illustrating an operation of the network when an unlearned packet arrives at the node B. As shown in FIG. 13, when a packet having SA=b and DA=a transmitted from a terminal apparatus on the LAN1 arrives at a port 1 of the Node B, the Node B processes the packet following the process flow shown in FIG. 2. First, the relay apparatus 10 of the Node B refers to the coincidence-information table 15. Because the packet is an unlearned packet, the packet is not discarded. In addition, because the DA is not stored in the MAC table 14, a flooding of the packet is performed to a port 2 and a port 3.

The flooding packet to the port 2 and the port 3 is buffered in a high-priority queue following the "method of suppressing the queuing delay itself by reading out a flooding packet in priority", and read out in priority.

Figure 14:
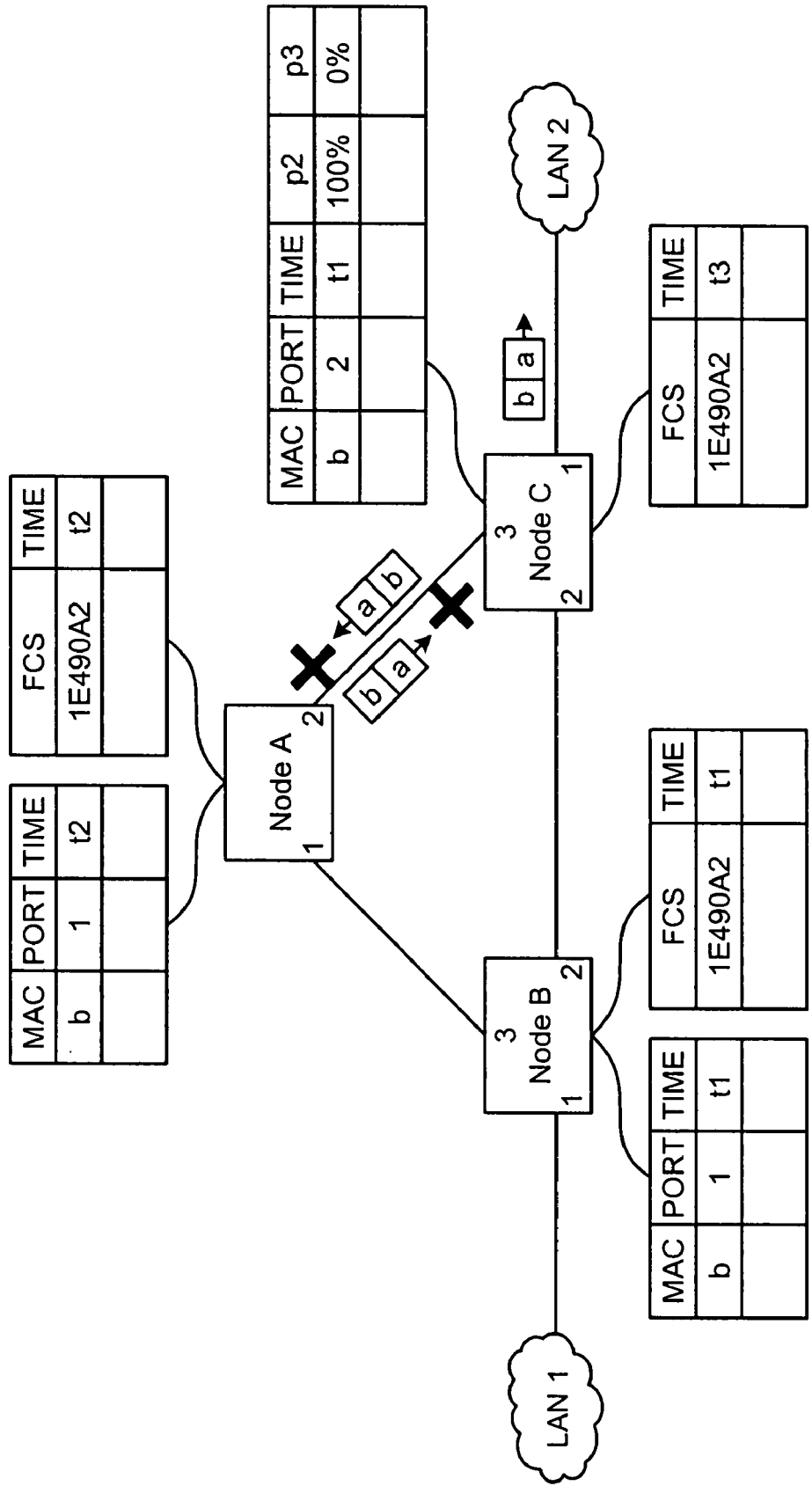
FIG. 14 is a schematic diagram for illustrating an operation of the network when a flooding packet arrives at a node C.

The flooding packets transmitted to the port 2 and the port 3 (two flooding packets) arrives at the Node C via two different paths (Link 2 and Link 1+Link 3), however, it is assumed that the flooding packet through the Link 2, i.e., the flooding packet arrives at a port 2 of the Node C is earlier than the other in the present example. FIG. 14 is a schematic diagram for illustrating an operation of the network when the flooding packet arrives at the node C.

Because the Node C also processes the flooding packet following the process flow shown in FIG. 2, after performing a storing of the FCS and a MAC learning, the Node C performs a flooding of the flooding packet to a port 1 and a port 3. According to the second embodiment, because the "method of determining the first-arrival port based on the first-arrival percentage" (see FIG. 10) is adopted as the method to improve the stability of the optimum path, the first-arrival percentage is held in the MAC table 14.

Because the flooding packet is a first packet having SA=b that arrived at the Node C, the first-arrival percentage of the port 2 is 100% at this moment. Although the first-arrival percentage is included only in the MAC table 14 of the Node C in FIG. 14, the other nodes (the Node A and the Node B) include same type of the MAC table 14.

Subsequently, as shown in FIG. 14, the flooding packet arrived later at the port 3 of the Node C is considered to be a later-arrived packet and discarded, because there is already a coincident FCS value in the coincidence-information table 15 of the Node C. Furthermore, the packet transmitted from the port 3 of the Node C is discarded because there is already a coincident FCS value in the coincidence-information table 15 of the Node A.

Figure 15:
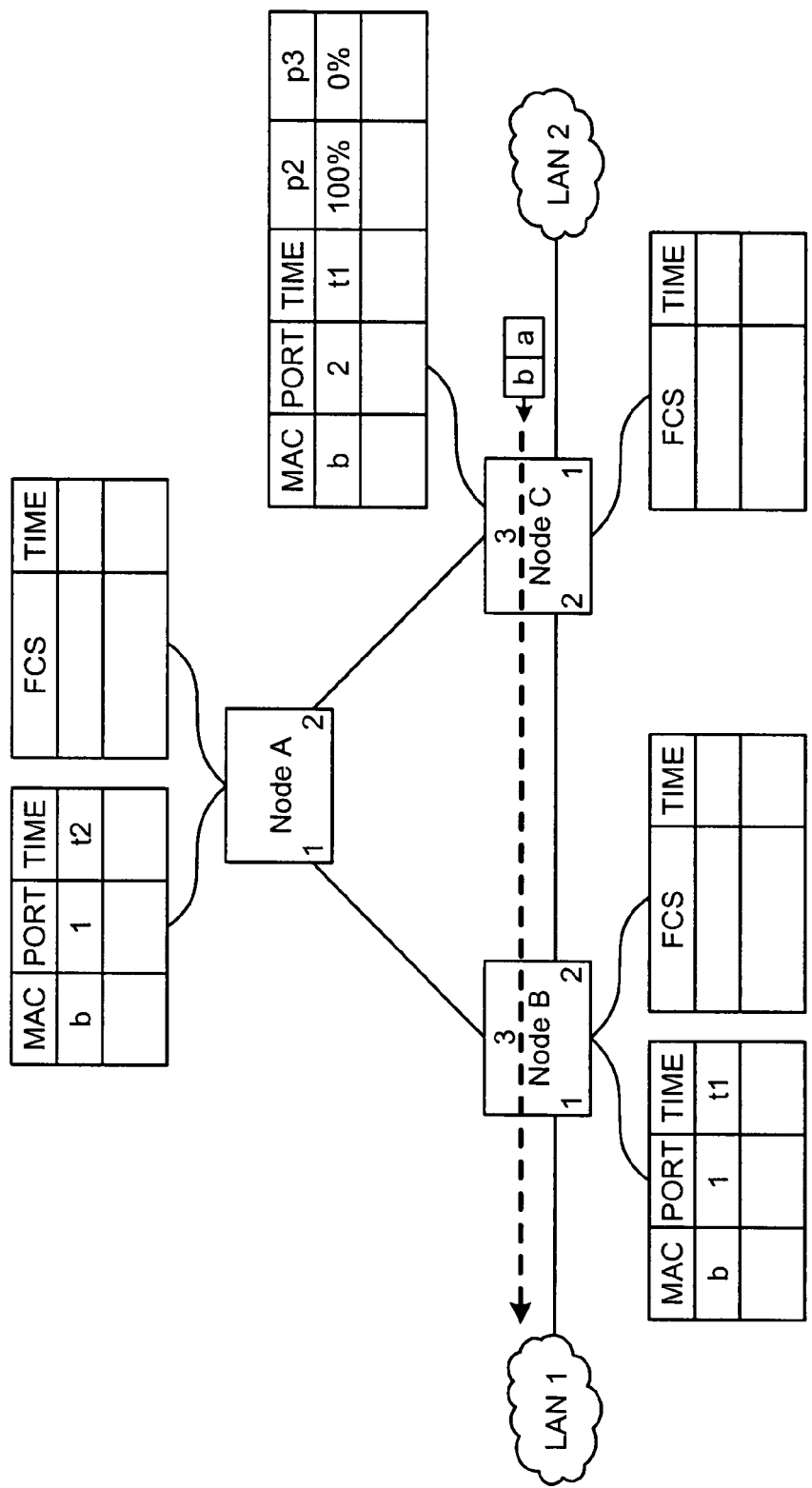
FIG. 15 is a schematic diagram for illustrating a transfer of a unicast packet.

A case in which a response packet to the flooding packet shown in FIG. 4 is transmitted from the LAN 2 will be explained with reference to FIG. 15. FIG. 15 is a schematic diagram for illustrating a transfer of a unicast packet. As shown in FIG. 15, the response packet transmitted from the LAN 2 is a packet having DA=b and SA=a. When the packet arrives at the Node C, the Node C processes the packet following the process flow shown in FIG. 2.

First of all the relay apparatus of the Node C refers to the coincidence-information table 15. The packet is not discarded because there is no coincident information in the coincidence-information table 15. Furthermore, it is checked whether DA=b exists in the MAC table 14, however, because DA=b already exists in the MAC table 14, the packet is transferred to the Node B via the port 2 as a unicast packet.

After a while from the state shown in FIG. 15, more flooding packets arrive at the Node C, and in this example, it is assumed that the delay is almost the same at a path Node B→Node C and at a path Node B→Node A→Node C.

Figure 16:
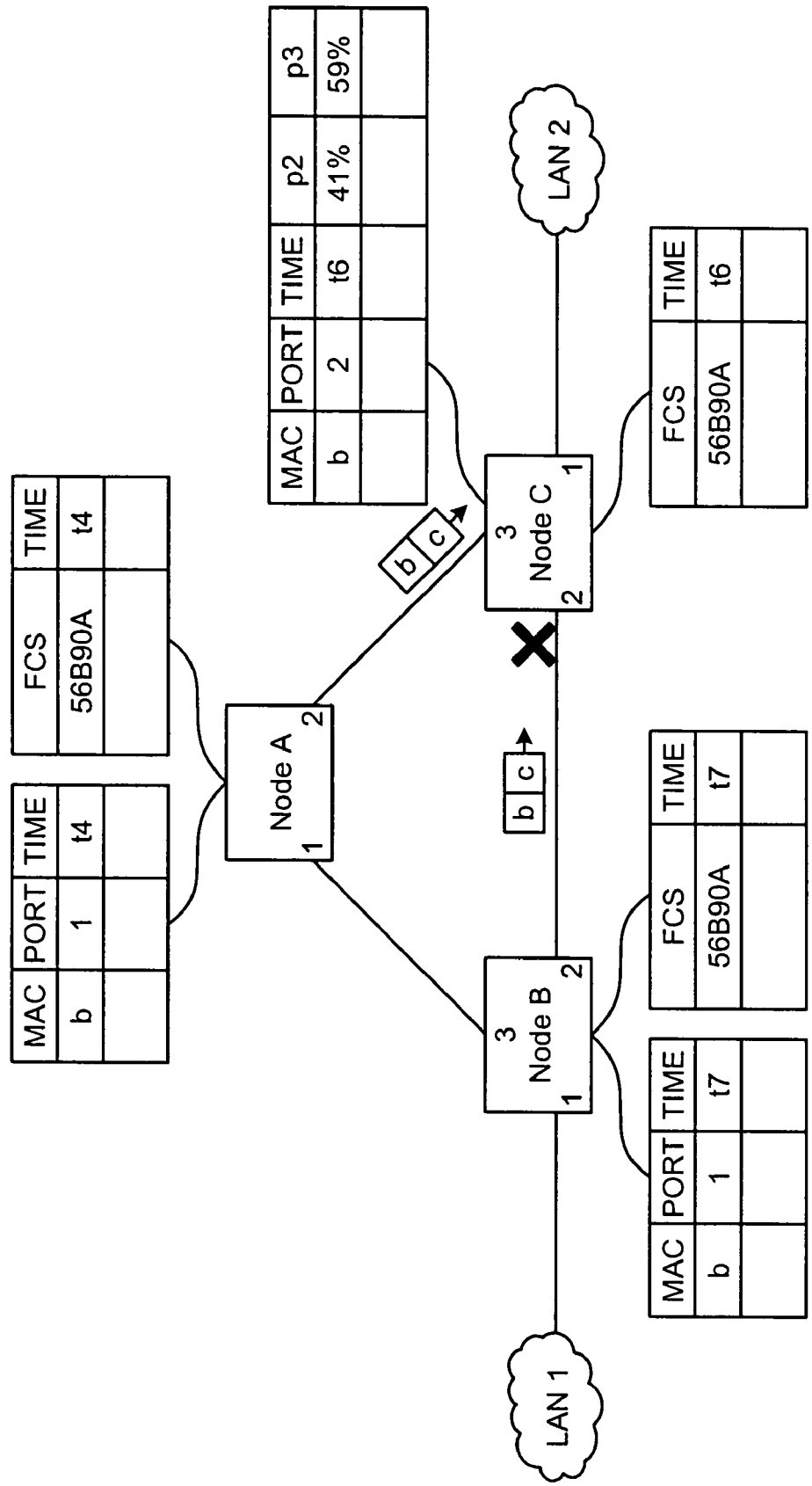
FIG. 16 is a schematic diagram for illustrating a state of the network before changing the first-arrival port.

According to the second embodiment, because the "method of determining the first-arrival port based on the first-arrival percentage" is adopted as the method to improve the stability of the optimum path, there may be a case in which the first-arrival port is changed. FIG. 16 is a schematic diagram for illustrating a state of the network before changing the first-arrival port. As shown in FIG. 16, in a state in which the first-arrival percentage of the port 2 in the Node C is slightly higher (41%) than 40% (the threshold for changing first-arrival port), and a flooding packet arrives at the port 3. If this causes the first-arrival percentage of the port 2 to become below 40% (the threshold for changing first-arrival port), a change of the first-arrival port would be performed.

Figure 17:
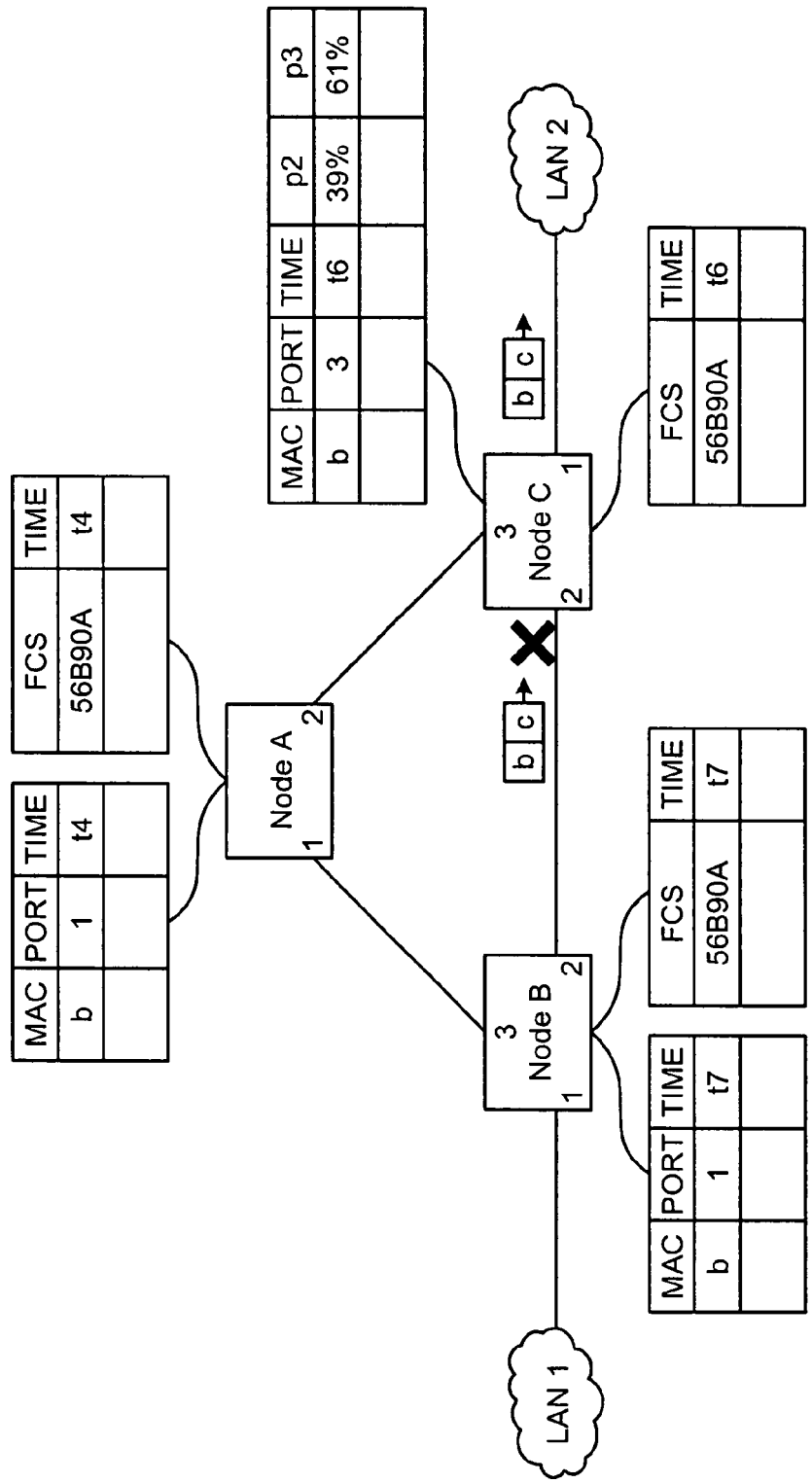
FIG. 17 is a schematic diagram for illustrating a state of the network after changing the first-arrival port.

FIG. 17 is a schematic diagram for illustrating a state of the network after changing the first-arrival port. As shown in FIG. 17, because the first-arrival percentage of the port 2 is 39%, which is below 40% (the threshold for changing first-arrival port), the port 3 is registered as a new first-arrival port. For the port 2 to be the first-arrival port again, 39% of the first-arrival percentage should be increased up to 60%, and therefore, a frequent change of the first-arrival port can be suppressed.

Figure 18:
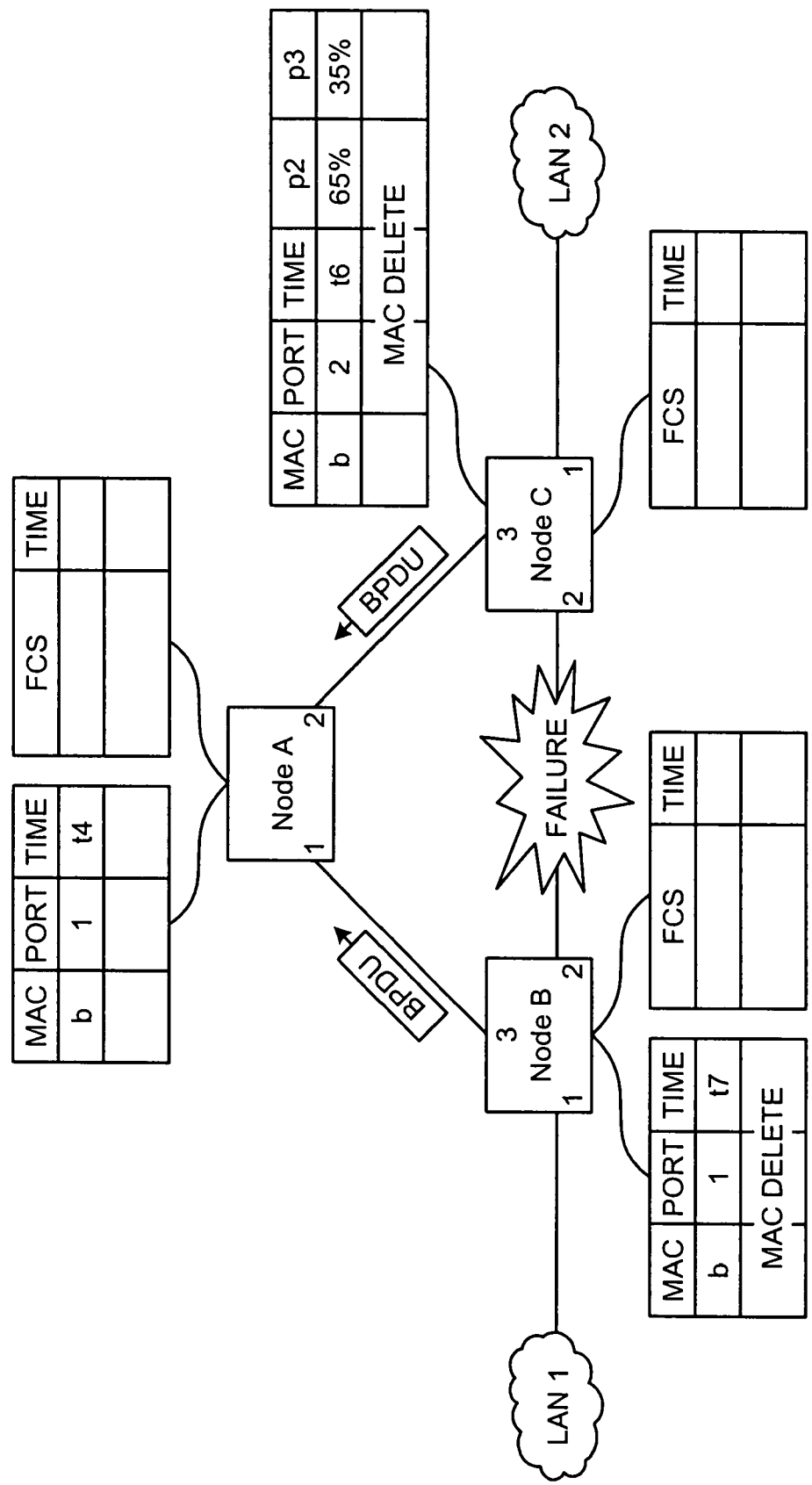
FIG. 18 is a schematic diagram for illustrating an operation of the network when a failure occurs.

FIG. 18 is a schematic diagram for illustrating an operation of the network when a failure occurs. Because the Node B and the Node C can detect the failure by detecting a failure of a physical layer, the relay apparatus of each of the Node B and the Node C deletes a corresponding field from the MAC table 14. Furthermore, the relay apparatus of each of the Node B and the Node C creates a BPDU following the "method of using the BPDU in the STP", and performs a flooding of the created BPDU. Then, the relay apparatus 10 of the Node A that received the BPDU deletes a corresponding field from the MAC table 14.

As described above, according to the second embodiment, a combination of the functions of the relay apparatus according to the first embodiment has been explained. However, the present invention is not limited to the above combination. Another functions explained in the first embodiment can be combined to implement another embodiment.

According to the above embodiments, the relay apparatus that implements the present invention has been explained from a functional point of view, however, each of the functions of the relay apparatus can be realized by executing a program on a computer, such as a personal computer (PC) and a workstation.

In other words, the various processing procedures described above can be realized by executing a program that is prepared in advance on a computer. The program can be distributed through a network such as the Ethernet (Registered trademark). Furthermore, the program can be recorded on a computer-readable recording medium such as a hard disk (HD), a flexible disk (FD), a compact disk-read only memory (CD-ROM), a magneto-optical (MO) disk, and a digital versatile disk (DVD). The computer can read out the program from the recording medium and execute the program.

As described above, according to one aspect of the present invention, a learning-target packet to be used for learning of a path is selected from packets that are queued by a relay apparatus, a relationship between a transmission-source address and a first-arrival port for the selected learning-target packet is registered as learning information, a packet corresponding to the registered learning information is transferred to a first-arrival port related to the learning information, and other packets are transferred to all ports. Therefore, an influence of a queuing delay can be reduced by learning a path after selecting a packet to be used for learning of the path from the packets that are queued, and an accuracy and a stability of an optimum path can be ensured.

Furthermore, according to another aspect of the present invention, the influence of the queuing delay can be reduced, and the accuracy of the optimum path can be increased by updating the learning information using a transfer priority that is set in a packet in advance.

Moreover, according to still another aspect of the present invention, the influence of the queuing delay can be reduced, and the accuracy of the optimum path can be increased by removing a low-priority packet from the learning target.

Furthermore, according to still another aspect of the present invention, the accuracy of the optimum path can be increased even in a network in which a service class is not defined.

Moreover, according to still another aspect of the present invention, the influence of the queuing delay can be reduced, and the accuracy of the optimum path can be increased by excluding an influence of a single isolated packet.

Furthermore, according to still another aspect of the present invention, the stability of the optimum path can be increased by avoiding a case in which the first-arrival port is changed frequently within a predetermined time.

Moreover, according to still another aspect of the present invention, it is possible to select an optimum first-arrival port statistically, and to prevent a frequent change of the first-arrival port.

Furthermore, according to still another aspect of the present invention, it is possible to promptly reselect the first-arrival port even when a failure occurs on a network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A first-arrival learning method of learning, as a first-arrival port, a port at which an identical packet that is transmitted through a plurality of paths by other relay apparatus arrives in a relay apparatus that controls a path of a packet in a network through which packets are distributed, the first-arrival learning method comprising:
   selecting a learning-target packet to be used for a path learning from among a plurality of packets queued by the relay apparatus, each of the packets queued by the relay apparatus being set a transfer priority;
   registering a relationship between a transmission-source address and the first-arrival port for the learning-target packet selected at the selecting, as learning information;
   packet transferring including
      transferring a packet corresponding to the learning information registered at the registering to the first-arrival port pertaining to the learning information; and
      transferring a packet that does not correspond to the learning information to all ports to which the packet is to be transferred,
   receiving other learning-target packet having a same transmission-source address as the transmission-source address pertaining to the learning information at other ports that are different from a current first-arrival port pertaining to the learning information; and
   setting a new first-arrival port having a largest first-arrival percentage from among the other ports when a first-arrival percentage of the current first-arrival port is below a predetermined threshold, wherein
   the registering includes updating, when the first-arrival port registered in the learning information is a first-arrival port for a low-priority packet, the learning information by changing the first-arrival port from the first-arrival port for the low-priority packet to a first-arrival port for a high-priority packet.

2. The first-arrival determining method according to claim 1, wherein the selecting includes selecting the high-priority packet as the learning-target packet.

3. The first-arrival determining method according to claim 1, wherein
   the packets queued by the relay apparatus includes a unicast packet that is transferred to a single port and a broadcast packet that is transferred to a plurality of ports,
   the packet transferring includes transferring the broadcast packet in priority over the unicast packet, and
   the selecting includes selecting the broadcast packet as the learning-target packet.

4. The first-arrival determining method according to claim 3, wherein the broadcast packet is a protocol control packet.

5. The first-arrival determining method according to claim 1, wherein the registering includes updating the learning information by determining the first-arrival port based on statistic information on first-arrival ports pertaining to a plurality of the learning-target packets.

6. The first-arrival determining method according to claim 1, wherein
   the registering includes registering the learning information including a learning time, and
   the learning information is not updated until a predetermined time passes from the learning time.

7. The first-arrival determining method according to claim 1, wherein when a learning-target packet having a same transmission-source address as the transmission-source address pertaining to the learning information arrives at other port that is different from the first-arrival port pertaining to the learning information, the registering includes setting the other port as a new first-arrival port with a condition that the learning-target packet having the same transmission-source address as the transmission-source address pertaining to the learning information arrives at the other port a predetermined number of times in a row.

8. The first-arrival determining method according to claim 1, wherein the setting includes setting a port having a largest first-arrival percentage from among the other ports as a new first-arrival port with a condition that a ratio of a first-arrival percentage of the first-arrival port pertaining to the learning information to the port having the largest first-arrival percentage is below a predetermined threshold.

9. The first-arrival determining method according to claim 1, wherein the registering includes prohibiting a change of the first-arrival port even when a learning-target packet having a same transmission-source address as the transmission-source address pertaining to the learning information arrives at other port that is different from the first-arrival port pertaining to the learning information.

10. The first-arrival determining method according to claim 1, wherein the packet transferring includes
   creating, when a failure is detected at a path or a node, a packet for deleting the learning information; and
   transferring the created packet for deleting the learning information, and
   the registering includes deleting, upon receiving the packet for deleting the learning information, the learning information.

11. The first-arrival determining method according to claim 10, wherein the packet for deleting the learning information is a bridge protocol data unit that is used in a spanning-tree protocol.

12. The first-arrival determining method according to claim 10, wherein the packet for deleting the learning information is an ordinary packet having a tag indicating a notification of the failure.

13. The first-arrival determining method according to claim 10, wherein the packet transferring includes transferring the packet that does not correspond to the learning information to all ports other than a port to which the packet is arrived.

14. The first-arrival determining method according to claim 10, wherein when a plurality of ports included in the relay apparatus are classified into groups, the transferring includes transferring the packet that does not correspond to the learning information to all ports belonging to a same group to which a port to which the packet is arrived belongs.

15. A relay apparatus that controls a path of a packet in a network through which packets are distributed, and learns, as a first-arrival port, a port at which an identical packet that is transmitted through a plurality of paths by other relay apparatus arrives first, the relay apparatus comprising:
   a learning-target selecting unit that selects a learning-target packet to be used for a path learning from among a plurality of packets queued by the relay apparatus, each of the packets queued by the relay apparatus being set a transfer priority;
   a learning-information registering unit that registers a relationship between a transmission-source address and the first-arrival port for the learning-target packet selected by the learning-target selecting unit, as learning information; and
   a packet transferring unit that transfers a packet corresponding to the learning information registered by the learning-information registering unit to the first-arrival port pertaining to the learning information, and transfers a packet that does not correspond to the learning information to all ports to which the packet is to be transferred, wherein the learning-target selecting unit receives other learning-target packet having a same transmission-source address as the transmission-source address pertaining to the learning information at other ports that are different from a current first-arrival port pertaining to the learning information, and the learning-information registering unit sets a new first-arrival port having a largest first-arrival percentage from among the other ports when a first-arrival percentage of the current first-arrival port is below a predetermined threshold, and updates, when the first-arrival port registered in the learning information is a first-arrival port for a low-priority packet, the learning information by changing the first-arrival port from the first-arrival port for the low-priority packet to a first-arrival port for a high-priority packet.

16. A non-transitory computer-readable recording medium that stores therein a computer program for a relay apparatus that controls a path of a packet in a network through which packets are distributed, and learns, as a first-arrival port, a port at which an identical packet that is transmitted through a plurality of paths by other relay apparatus arrives first, wherein the computer program causes a computer to execute:

selecting a learning-target packet to be used for a path learning from among a plurality of packets queued by the relay apparatus, each of the packets queued by the relay apparatus being set a transfer priority;

registering a relationship between a transmission-source address and the first-arrival port for the learning-target packet selected at the selecting, as learning information;

packet transferring including transferring a packet corresponding to the learning information registered at the registering to the first-arrival port pertaining to the learning information; and transferring a packet that does not correspond to the learning information to all ports to which the packet is to be transferred, receiving other learning-target packet having a same transmission-source address as the transmission-source address pertaining to the learning information at other ports that are different from a current first-arrival port pertaining to the learning information; and setting a new first-arrival port having a largest first-arrival percentage from among the other ports when a first-arrival percentage of the current first-arrival port is below a predetermined threshold, wherein the registering includes updating, when the first-arrival port registered in the learning information is a first-arrival port for a low-priority packet, the learning information by changing the first-arrival port from the first-arrival port for the low-priority packet to a first-arrival port for a high-priority packet.

* * * * *